United States Patent [19]

Pankow

[11] Patent Number: 5,227,039
[45] Date of Patent: * Jul. 13, 1993

[54] APPARATUS AND METHOD FOR CLEANING LENSES

[75] Inventor: Mark L. Pankow, Chicago, Ill.

[73] Assignee: Isoclear, Inc., Chicago, Ill.

[*] Notice: The portion of the term of this patent subsequent to Oct. 10, 2006 has been disclaimed.

[21] Appl. No.: 800,686

[22] Filed: Dec. 2, 1991

Related U.S. Application Data

[63] Continuation of Ser. No. 657,613, Feb. 20, 1991, abandoned, which is a continuation of Ser. No. 448,753, Dec. 11, 1989, abandoned.

[51] Int. Cl.$^5$ .......................... A61L 2/02; G02C 13/00
[52] U.S. Cl. ............................. 204/180.1; 204/299 R
[58] Field of Search ............... 134/901, 1; 204/299 R, 204/180.1; 422/22

[56] References Cited

U.S. PATENT DOCUMENTS

| | | | |
|---|---|---|---|
| 2,843,540 | 7/1958 | Ressler | 204/182.8 |
| 2,932,383 | 4/1960 | Fagan | 206/5.1 X |
| 3,037,616 | 5/1962 | Phipps, III | 206/5.1 X |
| 3,054,412 | 9/1962 | Nickell | 206/5.1 X |
| 3,083,819 | 4/1963 | Entzminger | 206/5.1 X |
| 3,089,500 | 5/1963 | Stalcup | 204/5.1 X |
| 3,317,417 | 5/1967 | Raymond | 204/299 R |
| 3,344,461 | 10/1967 | Floor | 204/5.1 X |
| 3,494,846 | 2/1970 | Arquembourg | 204/299 R |
| 3,764,513 | 10/1973 | Saravis | 204/299 R |
| 3,808,118 | 4/1974 | Golias | 204/299 R |
| 3,871,395 | 3/1975 | Murry | 134/107 |
| 3,896,021 | 7/1975 | Fosslien | 204/299 R |
| 3,930,973 | 1/1976 | Nerenberg | 204/182.8 |
| 3,998,590 | 12/1976 | Glorieux | 422/38 X |
| 4,187,574 | 2/1980 | Wrue | 15/104 |
| 4,202,740 | 5/1980 | Stoner et al. | 422/22 X |
| 4,559,662 | 12/1985 | Kunold, Jr. | 15/104 |
| 4,668,359 | 5/1987 | Postle et al. | 204/299 R |
| 4,732,185 | 3/1988 | Cowle et al. | 204/299 R |
| 4,852,592 | 8/1989 | Di Gangi et al. | 134/37 |
| 4,872,965 | 10/1989 | Pankow | 204/299 R |

FOREIGN PATENT DOCUMENTS 0268087 11/1986 European Pat. Off. .

Primary Examiner—John Niebling
Assistant Examiner—John S. Starsiak, Jr.
Attorney, Agent, or Firm—Lockwood, Alex, FitzGibbon & Cummings

[57] ABSTRACT

An apparatus and method by which permeable contact lenses may be cleaned through electrokinetic phenomenon is disclosed. The apparatus includes an receptacle in which a lens is supportively aligned between terminals by a member or members made from a pliant transmission media. As aligned, an electric current will be focused to flow only through the lens in order to efficiently and quickly decontaminate the lens.

33 Claims, 2 Drawing Sheets

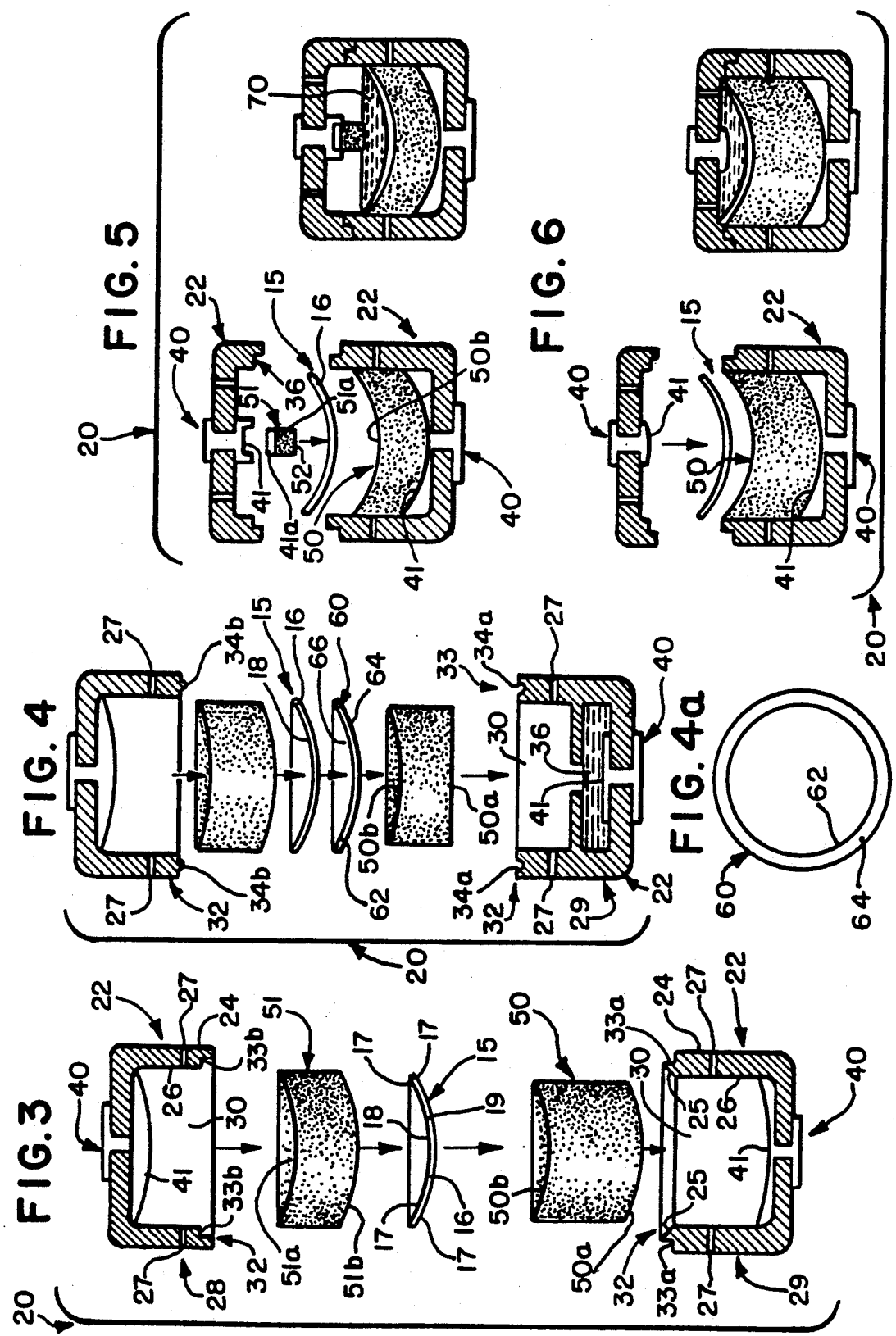

APPARATUS AND METHOD FOR CLEANING LENSES

This application is a continuation of application Ser. No. 07/657,613 filed Feb. 20, 1993, now abandoned, which is a continuation of application Ser. No. 07/448,753 filed Dec. 11, 1989, now abandoned.

BACKGROUND AND DESCRIPTION OF THE INVENTION

The present invention generally relates to an apparatus and methods for cleaning contact lenses. More particularly, the invention relates to an apparatus and method by which contact lenses, and specifically those which are water and/or gas permeable, are cleaned by the efficient application of an electrical field focused through the lens. Under the influence of the electrical field, contaminants migrate quickly from above and below the surface of the lens.

Contact lenses are thin films having a dominant convex surface and a dominant concave surface for placement directly onto a wearer's eyes generally to correct defects in vision. Contact lenses may be made from a variety of materials. One widely used type of material from which contact lens may be made is a gas permeable plastic. Another type or material comprises a hydrophilic gel. Both of these types of lenses are, on a molecular level, characteristically water-filled porous lattices that are water and/or ion permeable. Reference will be made herein to these types of lenses as permeable.

While the hydrated porosity of a permeable lens is advantageous in that it generally allows this type of lens to rest on the wearer's cornea without producing irritation, it is disadvantageous from the maintenance perspective. The water-filled porous structure of a permeable lens allows contaminants to become absorbed upon, or trapped below the surface of the lens.

Lens contaminants come from a variety of sources. The wearer's tears are generally the most significant single source of lens contamination. Many different types of inorganic and organic molecules and organisms become selectively absorbed onto a lens from the fluid which constantly bathes the lens. Another source is the atmosphere—a variety of inorganic and organic substances and organisms may be absorbed directly from the atmosphere onto or within the lens. The simple handling of the lens, such as when the lens is being placed on or taken off of the cornea, may cause a variety of contaminants, including oil, dirt, and bacteria or other organisms, to be transferred to the lens.

Contaminants diminish the optical performance of a lens. After a lens has been worn for a period of time, deposits become evident on or within the lens' clear structure. The deposits may appear as a white, partially, opaque occlusion or as a semi-transparent, possibly colored layer. Further problematic is that lens contaminants act as a substrate to facilitate the deposit of other inorganic or organic substances onto or within the lens. Visual acuity decreases with an increase in the lens opacity caused by the deposits.

Besides affecting the optical performance of a lens, lens contaminants can also affect the physiology of the eye. The contaminants act as a source of irritation. Further important to the wearer's health is that lens contaminants provide a suitable environment within which deleterious organisms such as bacteria, fungi, and yeast may flourish. Conjunctivitis or giant papillary conjunctivities may result from the contamination of a lens.

To lengthen the useful life of their contact lenses and avoid the physiological problems associated with contaminated lenses, wearers are instructed to follow a periodic cleaning and sterilizing regime. Because such procedures often include time consuming steps involving the use of often costly chemicals or equipment, wearers are generally lax in following the prescribed procedures and often make only a perfunctory and less than regular attempt at removing contaminants from the surface of their lenses.

Of the known apparatus and methods with which wearers may attempt to clean and/or sterilize their lenses, many include physical-based apparatus and methods, such as those that require scrubbing, agitation, and/or swirling. Other apparatus and methods are chemical-based and may employ surfactants, oxidizing agents, and/or enzymes. However, such conventional cleaning apparatus and methods are generally limited in their ability to clean a permeable lens completely and/or without harm to the lens.

To illustrate, known apparatus and techniques, such as those that clean by scrubbing or that rely on the use of strong chemicals, damage the fragile lattice structure from which permeable lenses are made. Other conventional apparatus and methods, while they may not damage a lens during cleaning, are unable to remove all of the contaminants lodged on the surface and may be wholly unable to remove contaminants situated farther below the surface of the lens. Even after a lens has been superficially cleaned, many conventional apparatus and methods leave a residue consisting of dislodged contaminants, chemicals, or a combination of both on, or below the surface of the lens. This residue may irritate or damage the cornea of the wearer. Also many conventional apparatus and methods require extended handling of the lens. Handling allows dirt and/or oil to be transferred to the lens plus may cause damage to the fragile, soft structure of the lens.

The present invention cleans permeable lens quickly and efficiently and without damage to it. The novel apparatus of this invention includes opposing terminals—with which separate electric charges may be conducted to an inner opening of a receptacle—and transmission media—composed of a substance by which a lens may be aligned between the terminals without damage to the surface or body of the lens and which when wetted is suitable for transmitting electrical charge and thereby focusing an electric current through the lens aligned on a member or members made from the media between the terminals.

In one preferred embodiment of the present invention, members made from the transmission media directly cover, without overlap, the dominant convex surface and the dominant concave surface of a lens so that the lens is aligned without distortion between the terminals. In a second preferred embodiment, the apparatus includes a member made form the transmission media that generally covers the dominant convex surface of the lens and a second member made from the transmission media that extends from one terminal into a layer of fluid covering the dominant concave surface of the lens. In a third embodiment, the apparatus includes one member made from the transmission media that generally covers the dominant convex surface of the lens to hold it in supportive alignment between the terminals, one terminal of which extends into fluid covering the dominant surface of the lens. Depending on the embodiment, the terminals may directly contact the transmission media members, the members being positioned to separately cover the dominant surfaces of the lens. Alternatively, one of the terminals may make indirect contact with one of the members covering one of the len's surface through a body of fluid. Additionally, one of the members may extend from direct contact with one of the terminals to a layer of fluid covering the concave surface of the lens. A different charge formed in each terminal is transmitted from each terminal: through a media member with which the terminal is in direct contact and to the lens; through a media member to a layer of fluid covering the lens concave surface and to the lens; or through a body of fluid to one of the media members in contact with the fluid and to the lens.

Because the media members, or, in other preferred embodiments, the fluid layer and the single media member, do not touch each other, the electrical current cannot "leak" around the lens and must flow through the lens. By focusing the electrical current through the lens, the present invention overcomes the disadvantages of conventional apparatus, such as that disclosed in U.S. Pat. No. 4,732,185, in which the lens is simply immersed in a body of fluid thereby allowing the current to flow—according to the path of least resistance—around the lens. At best, a partially clean lens results from the use of such conventional apparatus. With the present invention, the focused electrical current causes contaminants, such as inorganic and organic substances and organisms, to quickly migrate from below of, and off the surfaces of the lens. The contaminants pulled from the lens may be captured by a transmission media member. Any contaminants which remain loosely on the surfaces of the lens may be washed off. As the media member may be made from disposable material, the health risks associated with the cleaning of contaminated contact lens are lessened. It is through the use of the present invention that a permeable lens is cleaned and sterilized.

It is, accordingly, a general object of the present invention to provide an apparatus and methods by which lenses may be cleaned and sterilized.

Another object of the present invention is to provide an apparatus and methods by which permeable lenses may be cleaned and sterilized through the application of an electrical field.

An additional object of the present invention is to provide an apparatus and methods which utilize separate terminals to establish an electric current through a permeable lens aligned therebetween thereby cleaning the lens.

A further object of the present invention is to provide an apparatus and methods that facilitate the efficient use of an electric current to clean a permeable lens by allowing the electrical current to pass only through the lens to draw contaminants off and from within the body of the lens.

These and other, features and advantages of this invention will be clearly understood and explained with reference to the accompanying drawings and through a consideration of the following detailed description of the preferred embodiments.

BRIEF DESCRIPTION OF DRAWINGS

In the course of this description, reference will be made to the attached drawings, wherein:

FIG. 3 is a cross-sectional view of one preferred embodiment of the present invention in which a lens is aligned by separate transmission media members between terminals, each of the terminals being in direct contact with the media member;

FIG. 4 is a cross-sectional view of an alternative embodiment of the present invention in which one terminal indirectly contacts one of the transmission media members through a compartment generally containing conventional fluid;

FIG. 4a is an overhead view of one means to prevent leakage of an electric current around a lens;

FIG. 5 is a cross-sectional view of an alternative embodiment of the present invention in which the convex surface of the lens is generally covered by and held in supportive alignment between the terminals by a transmission media member; and FIG. 6 is a cross-sectional view of another alternative embodiment of the present invention in which one of the transmission media members, in direct contact with one of the terminals, extends upward to support a lens having a layer of fluid covering the concave surface of the lens.

DESCRIPTION OF THE PARTICULAR EMBODIMENT

Figure 1:
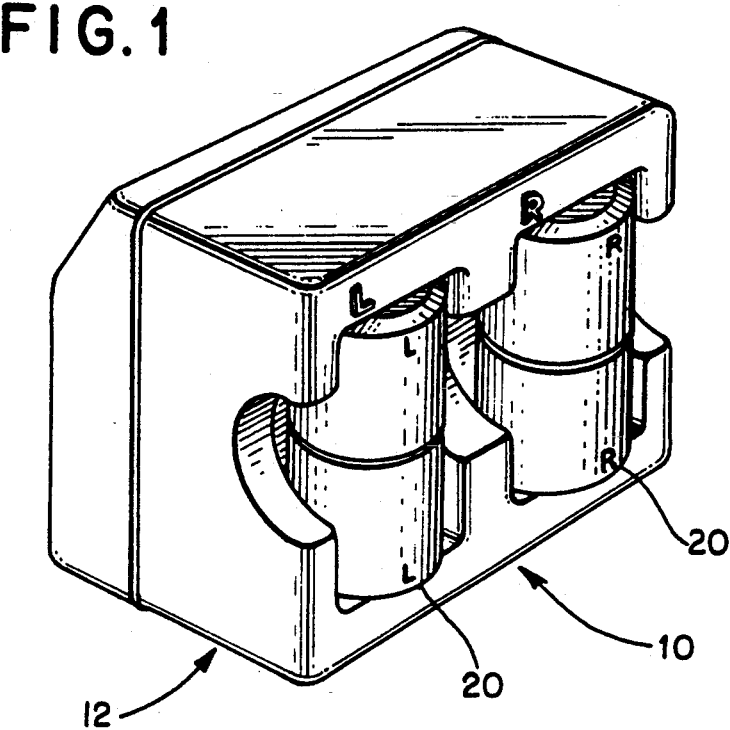
FIG. 1 is a perspective view of one embodiment of the present invention in which two receptacles are fitted in appropriately sized openings of a housing.
Figure 2:
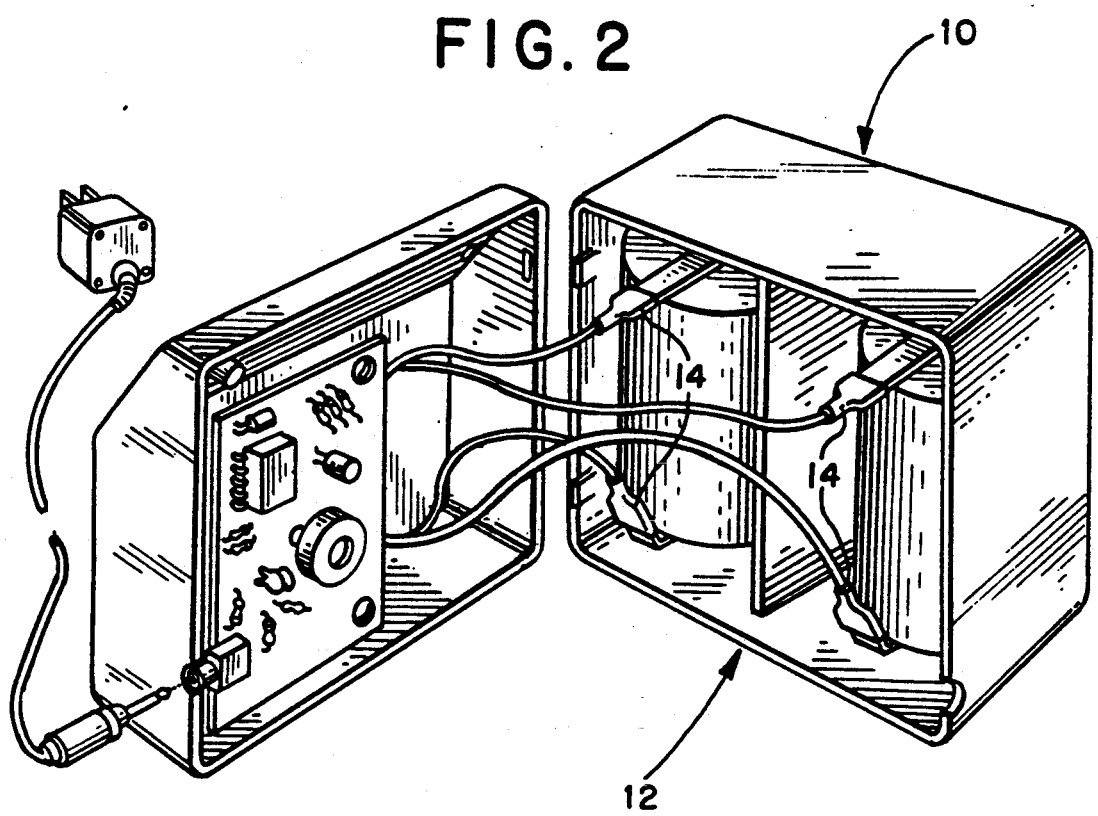
FIG. 2 is a perspective view of the embodiment illustrated in FIG. 1 and opened to show the circuitry.

A cleaning apparatus according to the present invention is generally illustrated and designated by reference number 10. Cleaning apparatus 10 may include a housing 12 having the circuitry 14 and sized to accommodate one or more receptacles 20. In FIG. 1, a housing 12—that is suitable to hold two receptacles 20 and by which a pair of lenses 15 may be cleaned simultaneously—is illustrated. In FIG. 2, the housing 12 illustrated in FIG. 1 is opened to partially show the circuitry 14.

As shown in cross section in FIGS. 3 through 6, each receptacle 20 includes a wall 22, having an outer face 24 and an inner face 26, and which may be made from a non-conducting material, such as plastic. To reduce the possible porosity of, and/or to increase the hydrophobic character of the material, a coating, such as one including silicone, may be applied to the inner face 26 of wall 22. Vents 27 may open through the wall 22 suitable for the discharge of, for example, gas.

Wall 22 separates into generally opposing receptacle segments 28 and 29 and to provide an opening 30. Opening 30 is sized to accept within it a lens 15, faces 41 of terminals 40, and, depending on the embodiment of the present invention, at least one transmission media member 50. The segments 28 and 29 may be joined by closure means 32 which provide a stable, safe, and watertight seal, such as those means that include the simple mating edges 33a, 33b illustrated in FIG. 3 or the snap-fit arrangement 34a, 34b illustrated in FIG. 4.

Terminals 40 open through the wall 22 into the opening 30 in positions so that a lens 15 may be juxtaposed therebetween. So that each terminal 40 may function as an electrode and communicate opposite electrical charges produced by the circuitry 14 included within the housing 12 of apparatus 10, terminals 40 are composed of a substance that is wholly or partially composed of metal. Each terminal 40 includes a face 41 by which each terminal 40 may communicate an electrical charge directly to a transmission media member or indirectly to the member through a body of fluid.

A lens 15 is supportively positioned between the terminals 40 by at least one member made from transmission media. The transmission media, is composed of a substance that is not inimical to the surface of, or the composition of a permeable lens 15 particularly when electrical charges are transmitted by and an electrical current is established through members 50 and/or 51 made from the media. The media must be capable of being wetted. Furthermore, the media must be sufficiently pliable and suitable for shaping and/or sizing in order that a permeable lens 15 may be covered by a member made from the media without causing damage or distortion to the surface of or body of the lens. Acceptable substances from which the transmission media may be made include pliant substances such as a foraminous material, for example, an open cell plastic foam, or paper, for example, high quality, ashless filter grade paper. Transmission media may be made also from a composite of materials, such as paper-sided plastic foam.

Disposed within the opening 30 is, depending on the embodiment, at least one member 50 made from the transmission media. In those preferred embodiments illustrated in FIGS. 3 through 5, two members 50, 51 made from the transmission media are disposed within the opening 30. The members 50, 51 include terminal contacting surfaces 50a, 51a through which the terminals 40 may make direct or indirect contact with the transmission media members 50, 51. In the embodiments of the present invention illustrated in FIGS. 3, the terminals 40 make direct contact with the transmission media members 50, 51. To facilitate the uniform communication of the electrical charge from each terminal 40 to each media member 50, 51, the terminal faces 41 and the contacting surfaces 50a, 51a of the members 50, 51 may be appropriately shaped. For example, in those embodiments in which the one of the members 50 supportively engages the lens 15 from its convex surface 16, the terminal 40 that is in contact with the member 50 may have a surface 41 which is generally concave, as in FIGS. 3, 5, and 6. Alternatively, in embodiments of the present invention, such as illustrated in FIG. 4 in which one of the terminals 40 makes indirect contact with the transmission media member 50 through fluid, the terminal contacting surface 50a of the member 50 may be generally flat and the terminal 40 may have a face 41 which is generally flat. The fluid may be held within a compartment 36 formed within the opening 30 of the receptacle 20 as in the embodiment illustrated in FIG. 4. In other embodiments such as illustrated in FIG. 5, the direct contact between the terminal 40 and the media member 51 may be facilitated by the inclusion of a terminal transmission interface 41a between the contacting face 51a of the media member 51 and the terminal face 41. The interface 41a may be shaped and made from a material, such as that from which the terminals 40 may be made, to facilitate the transmission of an electrical charge from a terminal 40 to the media member 51.

Each transmission media member 50 and/or 51 which covers one dominant surface 16 and/or 18 of a lens 15 correspondingly includes further a lens contacting surface 50b and/or 51b. The lens contacting surface 50b, 51b of the transmission media 50 and/or 51 may be sized and shaped to cover individually and without damage to or distortion of to the dominant surfaces 16, 18 of, and body 19 of the lens 15. For example, in the embodiment of the receptacle 20 illustrated in FIGS. 3 and 4 in which separate transmission media members 50 and 51 are disposed within the receptacle 20, the lens contacting surface 50b of transmission media 50 is shown as sized and shaped to cover the dominant convex surface 16 of the lens 15 and without overlap beyond this surface. In the same FIG. 3 embodiment, the lens contacting surface 51b of transmission media 51 is shown also as sized and shaped to cover the dominant concave surface 18 of the lens 15, and without overlap beyond this surface. In the embodiments of the receptacle illustrated in FIGS. 5 and 6, one transmission media member 50 is disposed within the receptacle 20 so that the lens contacting surface 50b of the member 50 covers and supportively engages the convex surface 16 of the lens 15.

Alternatively, as illustrated in FIG. 5, the member 51 may include a transmission face 52 by which an electrical charge may be communicated from the terminal 40 to the media member 51 and to a layer of fluid 70 which covers the concave surface 18 of the lens 15.

A lens 15 may be decontaminated and sterilized by the present invention according to the following methods. In that embodiment of the present invention, such as the one illustrated in FIG. 4, in which the receptacle 20 includes compartment 36, compartment 36 is filled with a fluid, such as conventional saline or ionic disinfecting solution. While each receptacle 20 may be made with a media member or media members fixed in place, in those embodiments having a transmission media member 50 or transmission media members 50, 51 that are insertable, the media members 50 and/or 51 are fitted within the opening 30. The media members 50 and/or 51 are thoroughly wetted, such as with the known solution.

The lens 15 is aligned preferably to maximize the surface area of the lens exposed to the direct flow of the electrical current established between the charged terminals 40. In the embodiments of the present invention illustrated in FIGS. 5 and 6, the convex surface 16 of the lens is supportively covered by the lens contacting surface 50b of the media member 50. In these same embodiments, the concave surface 18 of the lens 15 is covered by a layer 70 of fluid into which the member 51 extends from the terminal 40. In the embodiments of the present invention illustrated in FIGS. 3 and 4, lens 15 is placed onto each and between the transmission media 50, 51 so that, for example, the convex surface 16 of the lens 15 is generally covered by the lens contacting surface 50b of member 50 and the concave surface 18 of the lens 15 is generally covered by the lens contacting surface 51b of member 51. Beyond the surfaces 16, 18 of the lens 15 as covered, the media 50, 51 do not overlap to touch each other.

The receptacle 20 is joined and closed. The receptacle 20 may be included within a housing 12 having circuitry 14 suitable to facilitate the cleaning of a single lens 15 within a single receptacle 20. Alternatively, the receptacle may be insertable into a housing 12, as illustrated in FIG. 1, and may be held in place by known means, such as through spring loaded contact points, not shown. Power may be applied through a normal electrical lead and connected to a conventional source of 110 volt, 60 cycle, A.C. current supply, as illustrated in FIG. 1, or a separate electric source such as conventional batteries or known rechargeable batteries, not shown. For reasons of safety, the circuitry 14 may include known means to provide a low voltage charge.

Because in those embodiments with media members 50, 51, the members 50, 51 do not touch each other and, in those embodiments with member 50 and a layer of fluid 70, the member 50 and fluid layer 70 do not touch each other, the electrical charges transmitted by the terminals 40 to the members 50 and/or 51 and/or to the fluid layer 70 establishes an electrical current that is focused to flow through the lens 15 and that the does not "leak" around the lens 15. To insure that the current flows only through the lens 15, the apparatus 10 may include means to further focus the current. Such means may include edging of the inner face 26 of the wall 22, such as those edges 25 illustrated in FIG. 3, which may be shaped to engage an edge portion 17 of one of surfaces 16, 18 of the lens 15 thereby generally sealing and separating each media member 50, 51 from each other. Alternative means may include, as in the embodiment illustrated in FIGS. 4 and 4a, a ring 60, composed of a material through which an electrical current cannot be transmitted. Ring 60 may be juxtaposed in the receptacle 20 and between the lens 15 and one or both of the transmission media members 50 and/or 51. Ring 60 may be formed from a continuous segment 62 which is dimensioned and opened in order to cover the edge portion 17 of one or both of the lens surfaces 16 and/or 18 thereby separating the members 50, 51 from each other or the member 50 and the fluid layer 36 from each other to aid in the prevention of leakage of the electrical current around the lens 15. Ring 60 may be shaped to include surfaces 64, 66 that are correspondingly opposite to the surface 16 and/or 18 of the lens to prevent distortion to the lens 15.

The apparatus 10 cleans permeable lenses through the unique application of electrokinetic phenomenon. Soft contact lenses are made largely from hydrophilic molecules which absorb large proportions of water to form a gel, the gel being basically a molecular lattice existing within an aqueous environment. Most substances acquire a surface electric charge when brought into contact with an aqueous medium. The contaminants of a soft contact lens are no different. They are electrically charged largely as a result of their contact with the aqueous medium of the lens. It is known that a charged material, which is in contact with a liquid, will migrate relative to the stationary liquid under the influence of an applied electric field. It has been discovered that the contaminants absorbed on or trapped within the body of permeable lenses will migrate off and from within the lens when an electric field is applied to the lens. The present invention relies on this electrokinetic phenomenon to remove contaminants from a permeable lens.

As the apparatus 10 may include a housing 12 with circuitry 14 to provide the necessary separate charges to and accommodate one or more receptacles 20, through the operation of the apparatus 10 one or more lenses 15 may be cleaned in an amount of time which will vary with the extent to which each lens 15 is contaminated and the thickness of each lens 15. Since the current flow through the lens 15 to be cleaned, as measured in milliamps level, increases as the lens 15 becomes cleaner, and therefore electrical resistance decreases, the apparatus 10 may be fitted with separate means to stop the power flow to and therefore the cleaning process taking place in each receptacle 20 once a certain amperage level is attained. Alternatively, the apparatus 10 may include means to stop the power flow after the apparatus 10 has been allowed to run a certain period of time and as measured by a separate timing mechanism (not shown). Further alternatively, the apparatus 10 may include known means to stop the flow of power to the apparatus 10 at any point desired by the operator. Notation may be provided on the housing 12 of the apparatus 10, such as illustrated in FIG. 1, to identify that receptacle which holds the left lens and that receptacle which holds the right lens being cleaned. Notation such as this may be useful particularly when the individual lenses 15 vary in shape such as when one lens 15 is suitable to correct for astigmatism.

When in operation, deposits (not shown) or contaminants (not shown) will migrate from above and/or below the surface of the lens 15 to the faces 16, 18 of the lens 15 or onto the transmission media members 50 and/or 51. The deposits or contaminants may be removed from the lens 15 such as by washing with a fluid that may include a surfactant. Those deposits or contaminants that migrate onto the transmission media members 50 and/or 51 may be washed from them. The transmission media members 50 and/or 51 may also be composed of a material that generally allows the member or members to be simply discarded upon completion of the cleaning of the lens.

As will be understood by those skilled in the art, various arrangements other than those described in detail in the specification will occur to those persons skilled in the art which arrangements are within the spirit and scope of the invention. It is, therefore, to be understood that the invention is to be limited only by the claims appended hereto.

I claim:

1. Lens cleaning apparatus for removing contaminants from a permeable lens having a dominant convex surface and a dominant concave surface, comprising:
    a receptacle including an interior opening having generally opposing portions between which the lens is received;
    a pair of electrodes disposed within respective ones of said generally opposing portions;
    circuit means for establishing current flow between said electrodes;
    a pair of transmission media members disposed within respective ones of said generally opposing portions of said interior opening, each of said transmission media members comprising pliant fluid absorbent material;
    each of said transmission media members including a lens contacting surface, the lens contacting surface of one of said transmission media members sized and shaped to contact one dominant surface of the permeable lens, and the lens contacting surface of the other of said transmission media members sized and shaped to contact the other dominant surface of said lens; and
    said transmission media members when wetted with an electrically conductive fluid cooperating with said electrodes to establish an electric field through the lens when said lens is aligned between and contacted by said wetted transmission media members to clean said lens through electrokinetic phenomenon.

2. Lens cleaning apparatus as defined in claim 1 wherein said pliant material comprises a foraminous material.

3. Lens cleaning apparatus as defined in claim 1 wherein said pliant material comprises a highly porous polymer.

4. Lens cleaning apparatus as defined in claim 3 wherein said polymer comprises an open cell foam.

5. Lens cleaning apparatus as defined in claim 1 wherein said pliant material comprises an open cell foam.

6. Lens cleaning apparatus as defined in claim 1 wherein said pliant material comprises a paper.

7. Lens cleaning apparatus as defined in claim 1 wherein said pliant material comprises a composite material.

8. Lens cleaning apparatus as defined in claim 1 wherein said transmission media members are shaped and sized to separately cover the dominant surfaces of said lens without said transmission media members contacting each other.

9. Lens cleaning apparatus as defined in claim 1 wherein one of said electrodes contacts one of said transmission media members and the other of said electrodes contacts the other of said transmission media members.

10. Lens cleaning apparatus as defined in claim 1 wherein said transmission media members are substantially electrically insulated from each other in the absence of the permeable lens.

11. An apparatus for decontaminating a permeable lens, comprising:
a pair of electrodes disposed in spaced-apart relationship;
circuit means for establishing an electric current between said electrodes;
a pair of transmission media members disposed between said electrodes and spaced apart to receive the lens therebetween;
each of said transmission media members including an electrode contacting surface contacting a respective one of said electrodes and a lens contacting surface contacting a respective one of the dominant surfaces of the lens;
each of said transmission media members being formed of a pliant fluid absorbent material such that, when said media members are wetted with an electrically conductive fluid, said media members are capable of conveying an electrical current; and
said transmission media members and said electrodes cooperating when said permeable lens is positioned between and in contact with said transmission media members and said transmission media members are wetted with an electrically conductive fluid to establish an electric field through said permeable lens whereby contaminants on and within said lens are pulled from said lens and deposited onto said transmission media members under the influence of said current.

12. Decontamination apparatus as defined in claim 11 wherein said transmission media members each include a lens contacting surface by which each of said dominant surfaces of said lens is contacted without distortion to said lens.

13. Decontamination apparatus as defined in claim 11 wherein said receptacle includes a compartment suitable for holding a fluid.

14. An apparatus for decontaminating a permeable lens, comprising:
a receptacle including a non-electrically conductive wall defining an interior opening;
a pair of electrodes mounted on said wall on generally opposing sides of said opening;
a pair of transmission media members disposed within said interior opening;
each of said electrodes being in contact with a contacting surface of a respective one of said transmission media members;
each of said transmission media members comprising a pliant fluid absorbent material which when wetted with an electrically conductive fluid conveys an electrical current; and
said electrodes and transmission media members cooperating when said transmission media members are wetted by an electrically conductive fluid to establish an electric field through said lens when positioned between and in contact with said transmission media members whereby the lens is decontaminated by said field.

15. A method for cleaning and disinfecting a contaminated permeable lens having opposing surfaces, which method comprises:
positioning separate transmission media members formed of a pliant fluid absorbent material to contact individual opposing electrodes;
aligning the permeable lens between and in contact with the transmission media members;
wetting said transmission media members with an electrically conductive solution; and
establishing an electric current between said electrodes and through said wetted transmission media members and said lens aligned on lens contacting surfaces of said transmission media members whereby contaminants of said lens migrate under the influence of an electric field in the lens from within the body of or off the surface of said lens and onto said transmission media members.

16. An apparatus for removal of contaminants from a permeable lens having opposing dominant surfaces by the application of a focused electrical field, comprising:
a receptacle including a non-electrically conductive wall through which oppositely located electrodes communicate;
said wall defining an interior opening;
a pair of separate transmission media members disposed within said interior opening;
each of said transmission media members comprising a pliant fluid absorbent material;
said transmission media members each including a lens contacting surface in contact with a respective one of the dominant surfaces of the permeable lens without overlap beyond said dominant surfaces;
each of said transmission media members including an electrode contacting surface in contact with a respective one of said electrodes; and
said electrodes and transmission media members cooperating to provide an electric field through said permeable lens contacted by said transmission media members whereby contaminants migrate off and from within said lens under the influence of the electric field.

17. Contaminant removal apparatus as defined in claim 16 wherein said pliant fluid absorbent material is sufficiently pliant such that said transmission media member conforms to said dominant surface of said permeable lens when contacted by said transmission media member.

18. A method for decontaminating a lens which method comprises:

supporting a lens in alignment within a receptacle by engaging a dominant convex surface of said lens by a wetted transmission media member;

covering a dominant concave surface of said lens by a layer of fluid;

contacting a first electrode opening onto said receptacle with said wetted transmission media member;

contacting a second electrode opening onto said receptacle with said layer of fluid; and providing an electric current between said electrodes such that an electrical field is focused through the lens to pull contaminants off of and from within the lens.

19. An apparatus for cleaning a contact lens by an electric field established by electrodes, said contact lens having opposed dominant surfaces, said apparatus comprising:

a receptacle including an interior opening having generally opposing portions between which the lens is received;

a pair of electrodes disposed within said generally opposing portions;

pliant fluid absorbent material;

said material disposed within said interior opening of one of said generally opposing portions;

said material including a lens contacting surface sized and shaped to completely contact one of said dominant surfaces of the contact lens;

said material including an electrode contacting surface contacting one of said electrodes;

said material into which an electrically conductive fluid has been absorbed cooperates with the electrodes to establish the electric field through the lens contacted with said material to clean the lens through electrokinetic phenomenon.

20. Lens cleaning apparatus as defined in claim 19 wherein said pliant fluid absorbent material comprises a foraminous material.

21. Lens cleaning apparatus as defined in claim 19 wherein said pliant fluid absorbent material comprises a highly porous polymer.

22. Lens cleaning apparatus as defined in claim 21 wherein said polymer comprises an open cell foam.

23. Lens cleaning apparatus as defined in claim 19 wherein said pliant fluid absorbent material comprises an open cell foam.

24. Lens cleaning apparatus as defined in claim 19 wherein said pliant fluid absorbent material comprises a paper.

25. Lens cleaning apparatus as defined in claim 19 wherein said pliant fluid absorbent material comprises a composite material.

26. An apparatus for facilitating the removal of contaminants from a contact lens, said lens having opposing dominant surfaces, said apparatus comprising;

a pair of transmission media members, each of said transmission media members comprising pliant fluid absorbent material;

each of said transmission media members including a lens contacting surface, the lens contacting surface of one of said transmission media members being adapted for contacting one dominant surface of the lens, and the lens contacting surface of the other of said transmission media members being adapted for contacting the other dominant surface of said lens; and said transmission media members when wetted with an electrically conductive fluid cooperating with electrodes to establish an electric field through the lens when said lens is aligned between and contacted by said wetted transmission media members to clean said lens through electrokinetic phenomenon.

27. The apparatus as defined in claim 26 wherein at least one of said transmission media members includes a surface for contacting one of said electrodes.

28. Lens cleaning apparatus as defined in claim 26 wherein said pliant fluid absorbent material comprises a foraminous material.

29. Lens cleaning apparatus as defined in claim 26 wherein said pliant fluid material comprises a highly porous polymer.

30. Lens cleaning apparatus as defined in claim 26 wherein said pliant fluid absorbent material comprises an open cell foam.

31. Lens cleaning apparatus as defined in claim 29 wherein said polymer comprises an open cell foam.

32. Lens cleaning apparatus as defined in claim 26 wherein said pliant fluid absorbent material comprises a paper.

33. Lens cleaning apparatus as defined in claim 26 wherein said pliant fluid absorbent material comprises a composite material.

* * * * *